United States Patent [19]
Horan
[11] 3,722,088
[45] Mar. 27, 1973

[54] METHOD FOR FUNCTIONABLE STRUCTURAL ACCOMMODATION OF SNAP-IN ELECTRIC LAMPS

[76] Inventor: John J. Horan, 420 Quigley Ave., Willow Grove, Pa. 19090

[22] Filed: Dec. 8, 1969

[21] Appl. No.: 888,214

Related U.S. Application Data

[62] Division of Ser. No. 584,031, Sept. 7, 1966, Pat. No. 3,523,274.

[52] U.S. Cl. ....................29/629, 29/626, 113/119, 174/68.5, 317/101 CC, 339/17 D, 339/22 B, 339/242

[51] Int. Cl. ....................H02g 15/00, H05k 3/30

[58] Field of Search............29/629, 626, 630 D, 592; 113/119; 240/152, 8.16; 174/68.5; 317/101 CC, 101 CX; 339/19, 22, 242, 17

[56] References Cited

UNITED STATES PATENTS

| | | | |
|---|---|---|---|
| 3,440,716 | 4/1969 | Dreyer | 29/626 X |
| 3,528,173 | 9/1970 | Gall | 29/626 |
| 3,400,453 | 9/1968 | Tilesi | 29/592 |
| 2,472,747 | 6/1949 | Jones | 317/101 CC X |
| 2,869,040 | 1/1959 | Piper | 317/101 CC |
| 3,177,561 | 4/1965 | Oeler et al. | 317/101 CC |
| 1,691,877 | 11/1928 | Alden | 317/101 CC |

FOREIGN PATENTS OR APPLICATIONS

| | | | |
|---|---|---|---|
| 723,578 | 2/1955 | Great Britain | 317/101 R |
| 858,219 | 1/1961 | Great Britain | 317/101 R |
| 927,417 | 10/1947 | France | 317/101 |

*Primary Examiner*—Richard J. Herbst
*Assistant Examiner*—Robert W. Church

[57] ABSTRACT

A simple method for modifying metallic structures, such as those of instruments and vehicles, as well as those of buildings, to provide dilatable gaps therein for aligning, elastically holding, and electrically energizing lamps of a new push-insertion category designed to snap into position.

9 Claims, 46 Drawing Figures

METHOD FOR FUNCTIONABLE STRUCTURAL ACCOMMODATION OF SNAP-IN ELECTRIC LAMPS

This is a division of application Ser. No. 584,031, filed Sept. 7, 1966, issued as U.S. Pat. No. 3,523,274 Aug. 4, 1970.

This invention relates to coordinated means for reducing the overall installation cost of electric lighting in original equipment, such as vehicles, and in housing. Overall costs include many contributory ones, including purchase costs of lamps, sockets and other components, costs of site preparation, costs of installing sockets and coupling them to the electrical system, costs of testing, costs of repairing defects in the factory and under warranties, etc.; and the consumer then adds his maintenance cost. The disclosures herein represent a fully integrated attack on all these costs and they are intended to supersede old systems.

It is unnecessary to detail here the costs of building and maintaining older systems. The bayonet lamp was a contemporary of the ancient threaded Edison base; but it and the proliferated forms of delicate hardware employed to accommodate it in all but a comparative few of the earliest automobiles has been demanding an ever increasing share of the car buyer's dollar.

A few half-hearted attempts have been made to replace the bayonet lamp and its troublesome sockets in certain places in some automobiles. The wedge-base lamp has been the most successful of these and has accomplished limited cost saving; but it is so poorly adapted to vibratory environments that only a tiny 2-candlepower version has appeared in quantity. Now that the number of lamps per single automobile is counted by the dozens, very real cost savings and enhanced reliability can be achieved through adoption of the system described hereinafter. Additional savings can be realized in homes and throughout industry by employing this integrated system to supplant the Edison base also for new installations.

Among the objects of the invention are the following:

To reduce the cost of making individual lamps;

To eliminate any requirement for conventional sockets;

To teach the design of simplified holding means for lamps;

to reduce the costs of preparation of lamp sites further by optimum employment of environmental sheet metal;

To utilize the elastic properties of metals, including environmental panels of both structural and ornamental function, as simply, economically, and effectively as possible for holding lamps firmly against dislocation under vibration, and to provide such holding means with snug, compact, and simple electrical contacts;

To provide for simple plunge installation and pulling withdrawal of all lamps;

To hold all lamps against undesired ejection under realistic values of shock;

To eliminate trapping of moisture in the large capillary-clearance areas existing between conventional lamps and sockets, and thereby to prevent the rusting of lamps and sockets together, which degrades performance of replacement lamps;

To eliminate small and delicate auxiliary moving parts that cause shorts and open circuits when they fail.

Other objects and novel features will be found in the balance of this specification, in the claims, and in the drawings, which are not by way of limitation but illustrate the wide range of approaches to my invention. In the drawings:

Figures 1, 2, 3, 4, 5, 6, 14, 15, 16, 17, 18, 19:
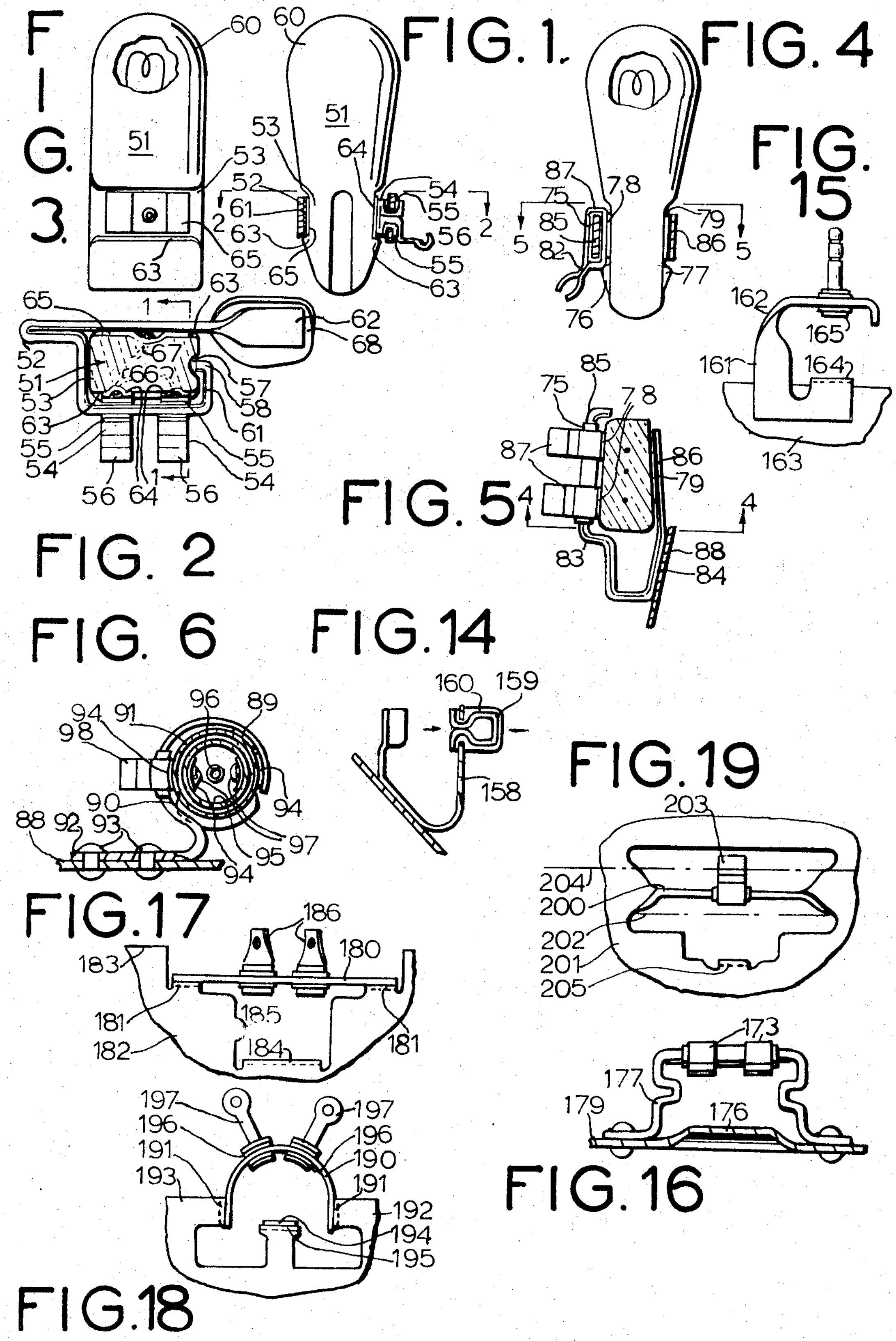
FIG. 1 is a partly sectioned drawing of a lamp and holder of this invention.
FIG. 2 is a section through the waist of FIG. 1, looking toward the holder.
FIG. 3 is an elevation of the lamp of FIG. 1 at a right angle thereto.
FIG. 4 is a partly sectioned view of a second lamp and holder of this invention.
FIG. 5 is a section through the waist of the lamp of FIG. 4, looking at the holder.
FIG. 6 is a section through the waist of a third lamp, looking toward the holder.
Figures 7, 8, 9, 10, 11, 12, 13, 20, 21, 22, 23, 24:
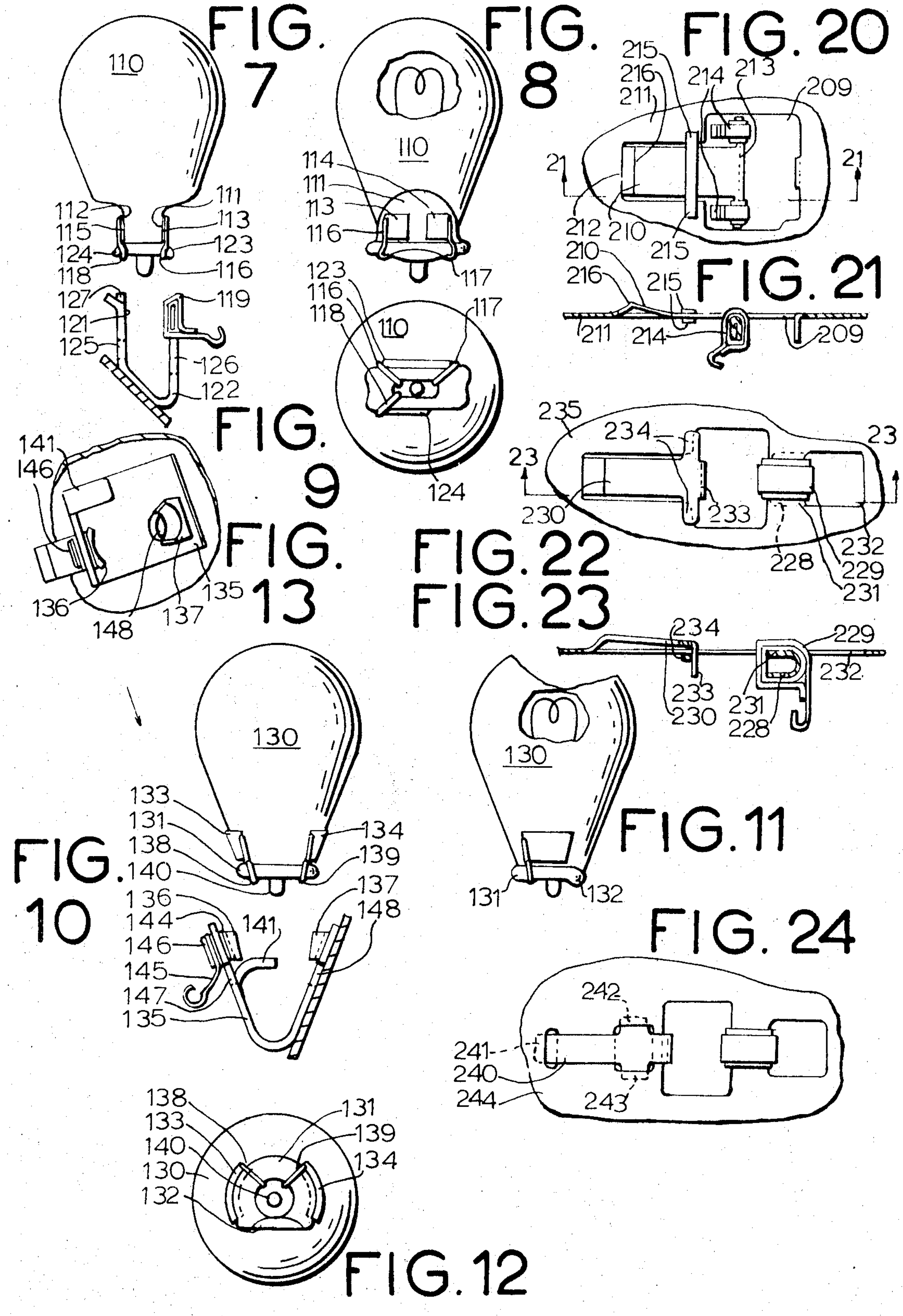
FIG. 7 is an elevation of a fourth lamp and holder, poised for assembly.
FIG. 8 is an elevation of the lamp of FIG. 7 at a right angle thereto.
FIG. 9 is an view looking upwardly at the bottom of the lamp of FIG. 7.
FIG. 10 is an elevation of a fifth lamp and holder poised for assembly.
FIG. 11 is an elevation of the lamp of FIG. 10 at a right angle thereto.
FIG. 12 is a view looking upwardly at the bottom of the lamp of FIG. 10
Figures 25, 26, 27, 28, 29, 30, 31, 32, 33, 34, 35, 36:
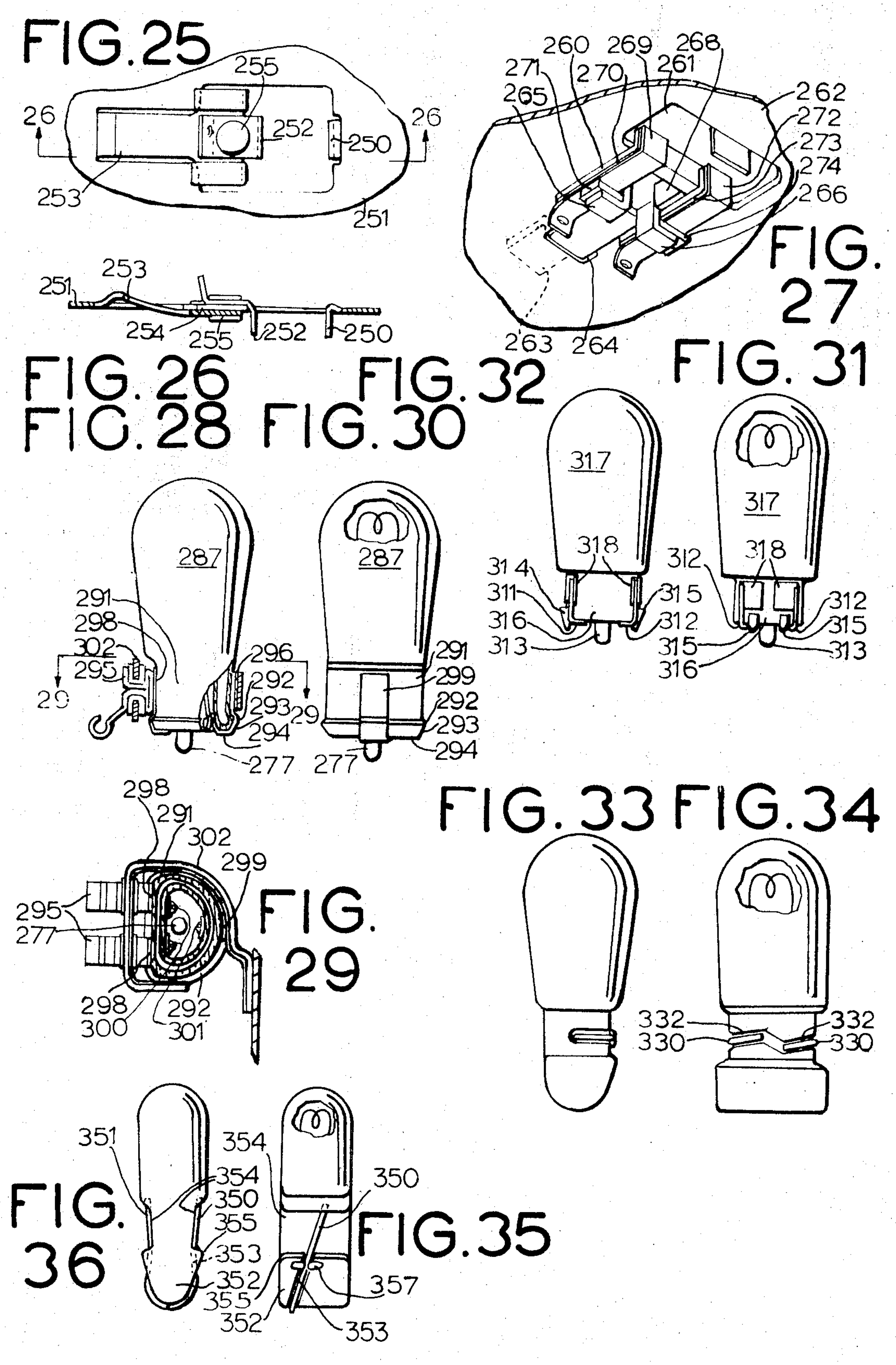
Figures 37, 38:
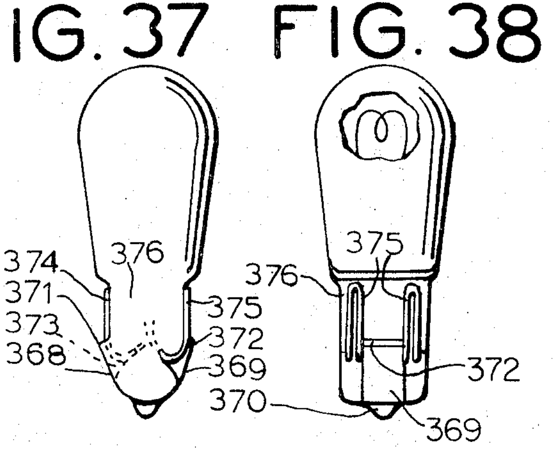
Figure 39:
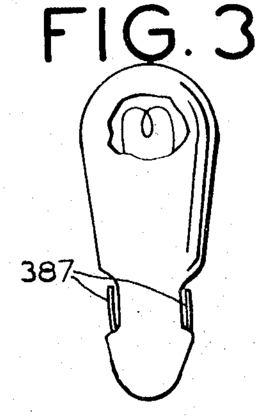
Figures 43, 44:
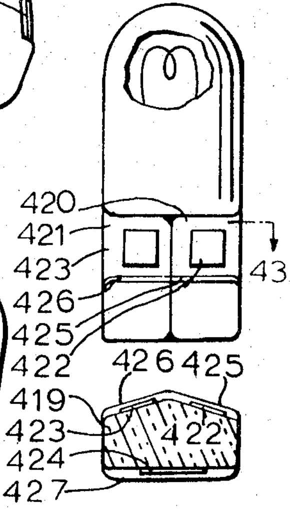
Figures 40, 41:
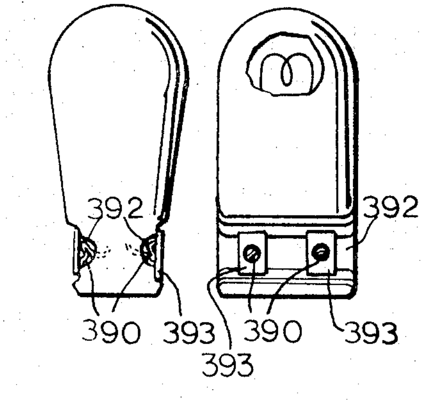
Figure 42:
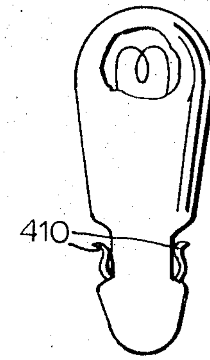
Figure 45:
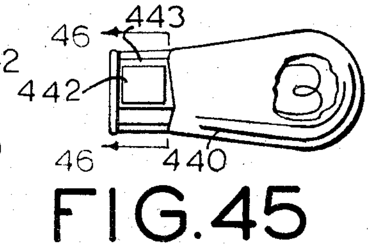

FIG. 13 looks obliquely at the holder of FIG. 10 in the direction of the arrow;

FIG. 14 is a partly sectioned view of a sixth holding structure;

FIG. 15 is a plan view of a seventh holding structure;

FIG. 16 is a plan view of an eighth holding structure;

FIG. 17 is a plan view of a ninth holding structure;

FIG. 18 is a plan view of a tenth holding structure;

FIG. 19 is a plan view of an eleventh holding structure;

FIG. 20 is a plan view of a twelfth holding structure;

FIG. 21 is a section through the panel of which the structure of FIG. 20 is an integral part;

FIG. 22 is a plan view of a thirteenth holding structure;

FIG. 23 is a section through the panel with which the structure of FIG. 22 is integral;

FIG. 24 is a plan view of a fourteenth holding structure;

FIG. 25 is a plan view of a fifteenth holding structure;

FIG. 26 is a section through a panel containing the structure of FIG. 25;

FIG. 27 is an oblique view from below of a sixteenth holding structure;

FIG. 28 is a partly sectioned view of a sixth lamp and seventeenth holder;

FIG. 29 is a section through the waist of the lamp of FIG. 28;

FIG. 30 is an elevation of the lamp of FIG. 28 at a right angle thereto;

FIG. 31 is an elevation of a seventh lamp of this invention;

FIG. 32 is an elevation of the lamp of FIG. 31 at a right angle thereto;

FIG. 33 is an elevation of an eighth lamp;

FIG. 34 is an elevation at a right angle to FIG. 33;

FIG. 35 is an elevation of a ninth lamp;

FIG. 36 is an elevation at a right angle to FIG. 35;

FIG. 37 is an elevation of a tenth lamp;

FIG. 38 is an elevation at a right angle to FIG. 37;

FIG. 39 is an elevation of an eleventh lamp;

FIG. 40 is an elevation of a twelfth lamp;

FIG. 41 is an elevation at a right angle to FIG. 40;

FIG. 42 is an elevation of a thirteenth lamp;

FIG. 43 is a section through the waist of a fourteenth lamp;

FIG. 44 is an elevation of the lamp of FIG. 43;

FIG. 45 is a view of a sixteenth lamp on its side; and

Figure 46:
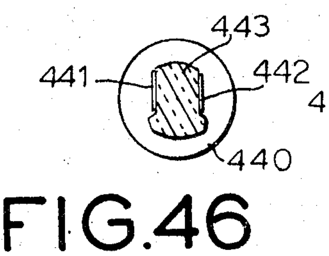

FIG. 46 is a section through the waist portion of the lamp of FIG. 45.

Other modifications, now obvious, may be made without departing from the spirit and scope of my invention.

Referring now to FIGS. 1, 2, and 3, there are shown a lamp 51 and a holding structure 52, the latter adapted to grip lamp 51 by its narrow waist section 53. Holder 52 carries a pair of contacts 54 insulatively installed on one wall or tab and facing one side of the waist or terminal section 53 of lamp 51. The wall of holder 52 has been pierced and vertically expanded to admit conductors 54 through the hole. Conductors 54 are thereupon press-formed in place from a folded strip of very thin metal having insulating strips 55 bonded thereto prior to installation. The press-forming operation also bends the longer of the two tabular legs of the folded strip into a loop 56, ready for swaging or soldering thereto of the terminal end of the wiring of the vehicle or other apparatus for which the installation is intended. Insulating strips 55 may be wider than the metal strip or may be squeezed down so as to widen out during assembly.

The terminal section 53 of lamp 51 may have one or more relatively flat sides. Since lamp 51 has two filaments or glow elements, it has a pair of individual terminals 64 on one side and a common or ground terminal 65 on the other. Groove 57, fitted by key 58 of holder 52 affords one way of polarizing, so that the lamp 51 cannot be installed the wrong way.

To provide sufficient clearance between the environmental metal structure 68 and the bulbous portion 60 of lamp 51, holder 52 has a twisted mounting leg 62, which can be spotwelded to any convenient surface 68. Because it is desirable to use in the holder 52 a metal having a relatively high electrical resistance in order to develop the necessary heat for spotwelding, steel is normally chosen. Holder 52 could be made principally of aluminum alloy if that were the environmental metal; but the tendency of unprotected aluminum surfaces to oxidize in air makes them undesirable as contacts. The high modulus of elasticity of steel and the superior strength it acquires in rolling and heat treating makes it an ideal structural material for holders, which must grip waist 53 of lamp 51 elastically between their opposed contacting faces.

Unfortunately, steel is subject to rusting; so, if the holder is not made of a rustless alloy having no oxide barrier, it should be plated, clad, or otherwise treated all over or locally so that current flow will not be impeded where the holder makes ground contact with terminal 65 of lamp 51. When the environmental metal is grounded, it is convenient to use plated side 61 of holder 52 for this.

Since holder 52 frames the terminal section or waist 53 of lamp 51, the gripping force exerted via conductor

54 and plated side 61 on terminals 64, 65 may be augmented by designing the non-contact-carrying legs or tabs of holder 52 with closer clearances so that they also can be called upon to aid in supporting lamps, that are relatively heavy or exposed to vibratory environments.

Below waist 53 of lamp 51 are a pair of integral hips 63, which measure a slightly greater distance across than do the outer mating surfaces of lamp terminals 64, 65 on waist 53. These hips constitute a pilot portion for installing the lamp 51 in holder 52, after which they serve as a latching means to prevent lamp 51 from working its way out of holder 52 as a result of the response of its inertia to vibratory conditions. In order to gain maximum performance and economy from this system, it is preferable to maintain a fairly precise dimensional relationship between the mating surfaces of terminals 64, 65 and the edges of the hips in line just below them. If the measurement differential is not well controlled, the system is penalized.

Terminals 64, 65 are preferably very thin, though the use of moderate thicknesses alone will not bar them from functioning. They may be electroplated on, silk-screened and fired, or perhaps be made of foil or thin stock and bonded in place, as long as their electrical resistance is kept within a range that will not cause undesirable self-heating. Lead wires 66, 67 making connections from within the lamp 51 to terminals 64, 65 may be soft, perhaps so soft that it may be convenient to upset-flatten their ends as they are trimmed, either prior to or after plating on terminals 64, 65, thus possibly further improving the electrical connections between leads and terminals. Terminals 64, 65 may include plural layers of conductors, perhaps applied by different processes.

Limitations of the graphic arts penalize the ability of the drawings to present fine detail in suitable scale where the details of terminals, contacting faces, and their relationships to hip or pilot portion dimensions are involved. The limitations are most severe wherever the thickness of an electroplated film must be shown. Although electroplated terminals may be relatively heavy as compared with plated coatings that are not required to carry current, they have to be vastly exaggerated in apparent thickness in the drawings. This is not to say that lamps with much thicker terminals or lamps with hip-to-waist differentials of the apparent magnitude seen in the drawings would be inoperable. Lamps of the character seen and/or described will function better than those in conventional service, even through the ideal dimensions should be clumsily exaggerated in order to make them seem to differ from this description.

The close control of terminal thickness and the stability of terminal position taught by this invention facilitates control of hip-versus-terminal differential measurement and enables the establishment of reliable minimum values for this differential in production lamps. Ideally, the hip span should be maintainable at values in the range of, say, only 0.005 inch to 0.015 inch greater than the span between the outer surfaces of terminals 64, 65 for miniature lamps, although system functioning could still be achieved with differences of a sixteenth or eighth of an inch, particularly in larger sizes and where large excursions of holding structure can be permitted.

The insulative camming action of hips 63, and the dimensional invariance that can be provided in their hard, smooth, invariant, low-friction, glass surfaces, enables maintenance of physical clearance between terminals 64, 65 on one hand and contacts 54 and 61 on the other until lamp 51 has completed virtually all of its engagement motion except for the final snap into conductive engagement. When the opposite sides of holder 52 are spread during the process of engagement, no part of the holder structure is permitted to be stressed beyond the elastic limit of the holder material. Thus, the smaller the hip-to-waist excursion, the less is the loss of clamping force by the structure, and, by the same token, the less is the hazard of overstressing the holder material during the insertion process. Should the clamping structure become overstressed at any point by the burden of stresses diffused within it, it would strain at such point and thus lose gripping power, increasing the risk of lamp ejection in vibratory service and possibly weakening the effectiveness of the contacting faces and the lamp terminals as means for transferring power into the lamp under adverse conditions. These environmental conditions are particularly severe in seacoast areas and in the conventional running and signal lights of vehicles, where the influx of moisture, including salt-saturated moisture splashed thereon and entering via defective seals, frequently destroys both conventional bayonet lamps and sockets at these points of circuit juncture, the adverse conditions being aggravated and failure hastened because of the arcing fostered by vibration.

Conventional Edison and bayonet sockets necessarily have inside diameters that are larger than the outside diameters of the bases of the lamps used with them. Consequently, there is much peripheral clearance between the metal of the base shell and that of the socket, the clearance area extending virtually 360° around the base of the lamp and nearly its full height. Yet, despite this relatively enormous area of proximity, there is still only a single line contact or two point contacts between the supposedly mating shells that constitute a bayonet joint. Besides being a very poor arrangement for passing electric current, the bayonet joint is a splendidly efficient design for trapping moisture and holding it in a capillary vise against evaporation long after everything else in the area has become dry, thus concentrating corrosive and often hygroscopic salts just where the surfaces need most to be dry and clean. By contrast, the lamps and structures of this invention, having mostly plane matching surfaces in firm contact in the better configurations, do not suffer from such ills. Moreover, since they are self-latching, they are not readily disengaged by vibration as are Edison-base lamps and wedge-base types.

In general, the magnitude of the hip-to-waist excursion must be a compromise between the desirability of positively latching lamp and structure under the most severe vibration on one hand versus ease of installation and intentional withdrawal, plus the economic necessity of keeping the overall installation cost at a minimum. Large excursions, of course, yield more positive latching.

The necking depth may be a greater factor in cost of the structure than in lamp cost. To avoid overstressing the holder by passage of unduly wide hips, the designer might lighten the gauge of the structural material or lengthen its unsupported span, but either step weakens the grip of the holder on the terminal section or waist of the lamp, increasing the possibility of failure. The designer might be forced to increase metal thickness at the same time that he increases distance between structural supports or points where the holder grips the lamp, both measures increasing the cost of the structure and the bulk of the occupied space.

Referring now to FIG. 4 and 5, the hips 76 on the left and 77 on the right of the pilot portion of the lamp differ from the prior version in that they are so narrow as to be completely hidden from view in FIG. 5 by conductors 86, 87, whose contacting faces register with the mating surfaces of lamp terminals 78, 79. Polarization asymmetry is achieved by non-parallel alignment of the opposite sides of the waist and hip portions of the glass body of the lamp. The effective moment arms of the tab ends of holder or substructure 83 are elongated by the inclusion of spotwelding projection 84 between the clamping walls 85 and 86; and conductors 87 are structured differently from those seen in prior figures. Angular orientation of spotwelding projection 84 provides clearance between environmental sheet metal 88, which may be part of the framework of a vehicle, and the bulbous part of the lamp.

Conductors 87 are formed in place by wrapping them over layer 75 of insulation that is in turn enwrapped upon one arm of holder 83. The insulation 75 may be first applied as shown; but usually it will have been pre-laminated to the conductor strip itself, which, like holder 83, is preferably made of pre-plated or pre-clad steel to facilitate spotwelding of the tips together at 82, while preserving a non-rusting finish where required. Terminal ends of vehicle supply wiring will be swaged, staked, or soldered in the open ends of contacts 87. Referring now to FIG. 6, holder 92 is cantilevered offset from environmental panel 88, to which it has been secured by rivets 93. Spotwelding might have been done here because it is usually cheaper, just as the other installations seen might have been riveted. The choice will be made on such consideration as the compatibility of the materials in the panel and the holder for the joining process availability of equipment at the site of installation, etc. Field repairs often involve riveting or bolting. There is sometimes an opportunity for soldering or brazing.

Hips 89 and 90 of the pilot portion of the lamp are asymmetrically placed out of radial alignment with terminals 94. There being no need to polarize the single filament lamp, the high asymmetry here provides only for registry of contacting faces of conductors 98, 92 (the holder being the grounded conductor) with the mating surfaces of terminals 94. If polarization were intended, the terminals and contacting faces might have been asymmetrically positioned instead of being arrayed diametrically opposite each other. Since hips 89, 90 of the pilot portion touch only the parent material of holder 92 and not conductor 98, at least one of them needs in this instance to be somewhat wide in angular measurement.

Lamp 91, being closed by tabulation 96, is adapted to be produced on existing forms of lamp making equipment so modified as to yield the waist-hip configurations shown for the terminal section and pilot portion. It has thin bonded terminals 94 that extend under and around the bottom rim and upwardly a short distance along the inner wall 95, where the short leads are secured 97 to their upper ends.

Referring now to FIGS. 7, 8, and 9, lamp bulb 110 receives additional squeeze operations at the base while hot to produce two opposed flat faces 111, 112, well suited for the application or coating of thin terminals 113, 114, and 115, the last being the common ground terminal on the flat face 112 opposite the one 111 bearing the others. The leads emerge from the underside, as seen in FIG. 9, around the sealing tubulation, for soldered attachment of each, 116, 117, and 118 to terminals 113, 114, and 115, respectively, the attachments being along the outer edges of the terminals so as not to interfere with firm registration upon the principal or mating surfaces of these terminals of the contacting faces of conductors 119, 120, and of ground conducting tab and 121, respectively, as carried on the right-hand tab of holder or substructure 122. Conductor 120 is not seen because it is directly behind conductor 119 in FIG. 7. Insulated conductors 119 and 120 resemble others seen herein, except for their angled upper edges that provide wedging surfaces on the approach side for facilitating the installation of lamp 110.

In the squeezing operation upon lamp 110, depressed lips or hips are left on opposite sides of the pilot portion. These lips first strike the angled entry surfaces of conductors 120, and 121 on one side of holder 122 and the angled edge of ground conductor tab 121 on the other, this last being integral with holder 122. The force thus applied between lamp 110 and holder 122 causes the open end of holder 122 to yield and spread further, the lips 123, 124 sliding down along the contacting faces of conductors 119, 120, and 121, wedging the ends of holder 122 apart until lips 123, 124 become aligned with transverse pierced slots 125, 126, respectively pierced below the conductors. These slots permit the lips 123, 124 to enter, thus letting holder 122 snap inwardly, with the contacting faces of conductors 119, 120, and 121 registering with firm pressure against the mating surfaces of terminals 113, 114, and 115, thus gripping lamp 110. Lip 124 is discontinuous at the right of FIG. 9. This means that the clearance is on the far side at the left in FIG. 7, which lines up with projection 127 on holder 122, polarizing the assembly.

Referring now to FIGS. 10, 11, 12, and 13, there is seen a lamp 130, which has been squeezed only slightly at the bottom. One edge 132 of the flange seal 131 at the base has given way and bent in part downwardly at 132, the clearance thus built in at 132 enabling lamp 130 to avoid finger 141 of holder 135, thus polarizing the assembly so that the contacting faces of conductors 136, 137 on opposed tabs register with the mating surfaces of terminals 133 and 134, respectively. A dual filament lamp would be similarly polarized. Terminals 133, 134 lie on the conical lower end of the glass. Lead wires 138, 139 exiting from within the stem around tabulation 140 are brought upwardly around flange 131 and each is soldered to one edge of terminals 133, 134, respectively, far enough to one side to be off the mating surfaces and thus out of line with the 180° opposed contacting faces of conductors 136, 137 of holder 135.

Conductor 136 is insulated 144 from holder 135 and its remote end is riveted down upon crimping tab 145. Holder 135 is pierced 147, 148 below conductors 136, 137 to allow clearance for flange or pilot portion 131 as it passes beyond them, permitting the contact faces to snap into registry upon the mating surfaces of lamp terminals 133, 134.

Referring now to FIG. 14, holder 158 has an inserted conductor 159 which is made of a single strip of metal coated with insulation 160 on the exterior surface only and adapted to be magazine fed in quantity along a feeder rod passing through its looped end. As each prepierced holder 158 in turn receives its conductor 159, pressure is applied from opposite sides as indicated by the arrows, the feeder rod serving temporarily only as a filler between the pressure plates. Afterwards, the holder 158 is bent into the modified U-shape seen in the drawing.

Referring next to FIG. 15, holder 161 is made of a single piece of metal twisted 162 at the left to make the 90° tabular, transition from panel 163 to an attitude appropriate for positioning and affixing insulated conductor 165 thereon. Tab 164, the grounded conductor, which is shown integral with holder 161, may be separately spotwelded to panel 163 or may be integral with the panel. If neither holder 162 nor panel 163 has a rustless conductive finish, a small rivet, having a suitable finish, may be applied thereon. Conductor 165 will be seen to depart from the character of other short stubby conductors that bridge through or around holder structure insulatively according to this invention, serving on one hand as fixed contacts for lamp terminals and on the other as means for coupling wiring harness terminals to the holder. The difference here is that, instead of having a concave surface for swaging or soldering to vehicle wiring, it has a post for accepting a sleeve end. Like the others herein, it is one-piece in character and needs no articulation. The fixed conductors herein, including conductor 165, are thus not subject to the breakage of delicate articulated types, and they are thus far less likely than those used in conventional lamp receivers to suffer short-circuiting or open-circuiting failures. The structures herein, too, are uniquely unitary even when built up, for they do not depend on springs or jointed relatively motion between components. Referring now to FIG. 16, structural panel 179, of which only a fragment shows, has been slit in two places and the strip 176 thus isolated has been inclined somewhat out of the plane of panel 179 to serve as ground contacting face or tab for a lamp of this invention. Holding substructure component member 177 is optionally riveted to panel 179; to complete the lampholding substructure, and its mid-portion, bearing conductors 173, is twisted slightly into alignment parallel with strip 176, the staking ends of conductors 173 being hidden below. The use of more than the minimum possible length of material in holder 177 and the folding of the material in the manner shown indicate an expedient for limiting the bending stress applied to component member 177 when the pilot portion of a lamp that is being inserted cams the faces of conductors 173 temporarily further away from panel 179 which constitutes the remaining portion of the lamp holding structure.

Referring now to FIG. 17, straight beam 180 spans the distance separating tabs 181, which are integral with and bent 90° from panel 182 near its edge 153.

Conductors 186 resemble those of FIG. 2, except that the ends are twisted and pierced for convenient soldering. They are arrayed across the gap from the contacting face of grounding tab 184; and polarizing tab 185 prevents a conforming lamp from being incorrectly installed in the holding structure thus constituted.

Referring now to FIG. 18, U-shaped arch 190 is spotwelded to tabs bent downwardly from panel 192 near its edge 193. Conductor 194 is spotwelded to tab 195 in order to improve the ground connection over that ordinarily available in a structural panel of ordinary material that is subject to corrosion. Insulators 196 prevent inserted stud conductors 197 from grounding around the holes pierced for them near the base of the U. Obviously, the holding structure thus constituted is contoured to accept a lamp having a D-shaped waist configuration.

Referring to FIG. 19, beam 200 is integral with panel 201. It has been twisted tabwise 90° to align insulated conductor 203 mounted thereon opposite bent-over ground conductor tab 205. Beam 200 has been partially sheared from panel 201 along line 202 when phantom line 204 represents the edge of panel 201. Whenever panel 201 extends above line 204, then beam 200 will have to be sheared along line 204 also. Except for insulated conductor 203, the holding substructure has been wholly formed from panel 201.

Referring now to FIGS. 20 and 21, tongue 210 is sheared from panel 211 along its sides, leaving it secured to the parent metal of panel 211 only along line 212. The T-portion of tongue 210 is made up mostly of material sheared from the large rectangular hole 209 and folded tabwise downwardly on both sides of the dashed fold line 213 running the length of the T. Conductors 214 are of the wrapped type resembling others herein. The stem of the T is bent out of the plane of the panel at 216; and a pair of tabs 215 is spotwelded top and bottom to tongue 210, bridging the slit that was pieced or sheared when the stem of the T was formed. These tabs 215 prevent tongue 210 from yielding excessively perpendicular to panel 211 when a lamp is pushed into opening 209 or removed therefrom. The tabs actually guide the tongue in a path parallel to the surface of panel 211 as it slides resiliently away from opening 209 under the cam action of the pilot portion of a lamp.

Referring now to FIGS. 22 and 23, the T shape of tongue 230 includes 180° folded tabs 234 at each end to serve as guides that prevent tongue 230 from yielding under lamp insertion forces except in small amplitude motion generally parallel with panel 235. The 90° folded over center tab becomes the grounded contacting face. The single insulated conductor 229 has been relocated upon tabular bridge 231, which has a U cross section, the lower leg 228 of the U being formed by a piercing and folding operation which leaves the smaller opening 232 at the right.

Referring now to FIG. 24, it is seen that tongue 240 is not integral with panel 244. Instead, the tabs 241, 242, and 243 are first bent down at a right angle to the principal plane of tongue 240; and all of the tabs on tongue 240 are next inserted into the holes in panel 244, after which they are bent laterally below panel 244, which thereafter retains tongue 240 as shown.

Referring to FIGS. 25 and 26, integral tab 250 is the ground contacting face, bent at a right angle out of panel 251. Conductor 252 is separated from integral tongue 253, by insulator 254. and held in position by insulating rivet 255, which may be of plastic or of metal precoated with plastic insulation.

Referring now to FIG. 27, tongue 260 is a metal stamping bent 90° to pass into opening 261 in panel 262. A dog-legged tab 263 is joggled at the opposite end, enabling it to fit into and be locked via opening 264 so that it will cock and buckle slightly when a lamp is forced into opening 261. The middle portion of tongue 260 is folded into four separate tabs, 265, 266, 267, and 268, tab 267 not being visible. Tab 265 is formed when strip conductor 269 and insulators 270, 271 are preassembled to tongue 260 prior to its assembly with panel 262. It grips contact 269 firmly between insulators 270, 271. Similarly, conductor 272, flanked by insulators 273, 274, is gripped by tab 266. Tabs 267 and 268 have been bent upwardly, opposite the directions of bending of tabs 265 and 266, prior to mounting of tongue 260 on panel 262, so that these tabs may be admitted into a third opening 275 located in panel 262 between openings 261 and 264 and hidden from view by the presence of tongue 260. The ends of tabs 267 and 268 are then bent laterally in opposite directions to lock tongue 260 onto panel 262.

Referring next to FIGS. 28, 29, and 30, lamp 287 has a terminal section 291, with a pilot ridge portion 292 just below it. Ridge or hip 292 surmounts conically tapered surface 293 rising from the bottom edge 294. When lamp 287 is being inserted between the faces of conductors 295 and 296, the latter being a plated coating provided on the holding structure for optimum ground connection, the tapered portion 293 wedges the oppositely positioned conductors apart, the maximum wedging excursion being enforced by passage of pilot ridge or hip 292. As ridge 292 completes its transit through the spring constriction exerted by holder 302, the opposite arms carrying conductors 295, 296 try to recover their former relaxed positions and, in so doing, press the faces of conductors 295, 296 forcefully against the mating surfaces of individual filament terminals 298 and 299, respectively, on terminal section 291 of the lamp.

Plated terminals 298 and 299 run down from the waist 291 over the ridge 292, the tapered surface 293, the bottom 294, and up a short distance into the interior of the stem cavity of this tubulation sealed lamp, where each terminal meets and is secured to its respective lead 300, 301.

Although this construction might seem to contradict, at least in part, principles of terminal section vs. pilot portion relationship (waist-hip relationship) set forth hereinbefore, this is a special case. That part of terminals 298, and 299 that serves as the terminal section is still the necked-down upper part above the hips or ridge 292 that feels the pressure of the contacting faces of the holding structure. The terminals are again affixed to this terminal section. The same surface discontinuity seen between pilot portion and waist of other lamps of this invention is again seen. The lamp fits the same generic kind of holding structure invented herein. It was stated earlier that the waist-to-hip differentials ought best to approximate 0.005 inch to 0.015 inch for the smaller lamps and that larger excursions might be expected with larger lamps. (Even smaller excursions can be made to work if the contacting face is prevented by appropriate precaution from digging into the terminal during assembly.)

The thickness of plating or coating on the terminals need not exceed one or two thousandths of an inch; and the film follows the glass contour faithfully, without excessively coarsening the fillets or bridging any part of the waist. Thus, it adds its slim silhouette equally to both waist and hip measurements, without adversely affecting the measurement differential between them, changing their shapes or their detenting behavior, without buckling or being moved aside. Preferably, of course, a path will be found for these plated extensions of terminals, or leads, that will not lead over the prominent edge of the hip where it encounters the contacting face of a conductor on the holding structure during installation of the lamp. The designer will be aware that the passage of a plated extension over the crest of the hip invites short circuiting between the contacting face of an insulated conductor and the metal of the wall adjacent to the insertion point of the conductor. It is better to recess the conductive surfaces when they pass the pilot portion.

Referring now to FIGS. 31 and 32, three tiny terminal plates 318 are bonded asymmetrically around the small-diameter lower portion 316 or waist of lamp 317. Common ground lead 311 and filament leads 312 are each soldered along the far edge of respective terminal plates. These leads all issue from within lamp 317 via the bottom cavity around tubulation seal 313. One hip 314 is bonded to or gathered from the glass at the extreme bottom alongside lead 311 below the mating surface of its terminal plate and two more hips 315 are similarly located between leads 312 and below their terminals. This construction can be less subject to the possible occurrence of short circuits than the prior type.

Referring now to FIGS. 33 and 34, the lamp has two leads 330 showing on the facing side 331 of the waist, as seen in FIG. 34. As may be observed in the profile of FIG. 33, these hard and springy leads, though partly recessed in grooves 332, are bowed so as to project outwardly beyond the groove faces and receive direct pressure from contacting faces of conductors in a conforming holder. Since leads 330 will usually be puny in strength as compared with the relatively massive holder structure, they constitute low rate springs that will be forced back toward their grooves in a resilient manner, while the holder will also grip the glass in the area around them mechanically. The mechanical force exerted by the springy leads or terminals 330 against the contacting faces in the holder provides assurance of electrical continuity, particularly for low-wattage applications such as in gas-discharge indicator lamps. Because both sides of an indicator voltage may often conveniently be above ground, the placement of both terminals on one side with a single hip below them permits dual-contact holders to be used for this single element lamp in a manner that avoids grounding either side of the circuit.

Referring to FIGS. 35 and 36, there is shown a single-filament lamp having a pair of leads 350, 351 emanating from the bottom and running in opposite directions and thence upwardly alongside the tapered portion 352, pass the hips 355 of the pilot portion via biased slots 353 and thence upwardly and slightly outwardly against tapered wall 354 of the waist portion. Tapering the waist portion in this manner may improve the rigidity of lamp mounting owing to the consequent assurance of pressure of hip 355 against the lower edge of the holder. However, tapers are generally undesirable when their introduction involves increasing materially the hip-to-waist measurement differential, this rule serving also for reverse tilts and for double-tilt or V-shaped terminals. The application of close controls between the height of the wall of the holder and the height of the necked-down terminal section of the lamp would also enhance the accuracy and rigidity of lamp mounting.

The lead on the facing side of FIG. 35 is shown trapped by a shallow pinch 357 just below hip 355. Alternatively, adhesives might be deposited in the grooves or slots 353. The upper ends of leads 350, 351 are trapped in the glass just above the terminal section waist press. Unless the leads are fragile, it will usually be sufficient to hold them either above or below (or within) the waist. The use of flat ribbon leads may be desirable.

Referring now to FIGS. 37 and 38, the wedging surfaces 369, 368 above the seal tip 370 separate to hip maxima 372, 371 of the pilot portion before becoming reentrant to form terminal section 376. A ground lead 374 passes upwardly within a groove 373 in hip 371 on the far side of FIG. 39; and a pair of leads 375 on the facing side flanks hip 372 and completes the complement of termini. All terminal leads 374, 375 are of double wire, their tips having been buried in the glass at or near the points of egress.

Referring now to FIG. 39, it is reasonable to modify the leads of the prior embodiment by making them of hard material and bowing them, as at 387, and omitting the doubling operation so that, when the lamp is inserted into holding structure, the structure will force the firm leads inwardly and resiliently toward the glass, maintaining a nice resilient line contact.

Referring now to FIGS. 40 and 41, leads 390 emerge from the glass at waist level and, instead of being trimmed as closely as those of FIGS. 1 to 3, the excess metal is bent back into grooves 392 containing the points of emergence. Terminal plates 393 are bonded in place, bridging grooves 392. If the bond material is conductive, no separate soldering operation will need to be performed between wires 390 and terminal plates 393.

Referring now to FIG. 42, the hard, sharp-pointed terminal wires 410 will dig into and lessen contact resistance of conductor faces made of soft materials.

Referring now to FIGS. 43 and 44, it becomes evident that one effective way of polarizing these installations is to provide a slight angularity between mating surfaces of adjacent terminals 422, 423 borne of faces 420, 421 of terminal section 419. The ground terminal is on the opposite side. The hips 425 and 426 of the pilot portion below the terminals are also split and arrayed in plural planes opposite hip 427.

Referring now to FIGS. 45 and 46, the plunge axis of lamp 440 is perpendicular to the longitudinal axis. Lamp 440 has terminals 441, 442 on opposite sides of its narrow waist portion 443, with a pilot portion having symmetrical hips thereunder.

The basic designs of the foregoing lamps and structures and the moderate requirements they now impose on each other enable the costs of the lighting function, the holding function, and of the installation effort to be held to the absolute minimum. Taking the first embodiment as a single example, the fabrication, assembly, and testing of the lamp and everything associated therewith are suited for complete automation all the way until they become a unit ready for installation. Moreover, their installation on a vehicle production line becomes the simple two-operation task of spot-welding, followed by crimping of harness termini to the insulated conductors. The other embodiments are similarly suited for conserving purchase costs, space, and assembly time.

The fact that there are no soft, delicate, small, or articulated components of the lamp or its holding means subject to gross excursions under low-frequency vibration insures long trouble-free life in the rugged environments of vehicles. Even the insulated or "hot" contacts are part of the firm monostructure that contrasts so sharply with sloppy, multi-component, relatively costly and trouble-breeding, "hung-on," traditional designs of lamp mountings.

This is neither solely a lamp invention nor solely a structural invention, nor does it consist only of two separate families of improvements. It is, of course, all of these things; but it is much more. It is an inventive integration of ideas that build into a system philosophy that is new, and bold, and broad. The system so created is not just a part of the lamp art, not does it derive in any way from conventional sockets, for it eliminates them altogether, drastically slashing the customary component array that mediates between the light source and the device (house, car, etc.) served by it.

Many combinations will be immediately obvious to those skilled in the art as a consequence of my disclosures, without departing from the true scope of this invention. It is, accordingly, intended to include in the appended claims such portions and equivalents as may fall within this scope. I wish it understood that my invention is not to be limited to the specific forms to which I have limited my descriptions, drawings, and claims for the sake of expeditious prosecution.

Therefore, I claim:

1. A method of forming a socket means in a relatively large, thin-walled metallic parent structure for holding at a selected site thereon and providing an electrical energy conduit means for an electrical device of a class having a relatively thin terminal section joining a thicker pilot portion and a head portion containing a source of radiant energy, said method comprising:

forming locally upon said parent structure at said site a resilient constraining substructure comprising at least two upstanding tabs mutually opposed across an aperture therebetween; and securing a conductor insulatively along one of the said tabs leaving a portion of said conductor for external electrical connection, said substructure being configured for susceptibility to repeated elastic dilations of said aperture by the forced passage therethrough of said pilot portion without permanently increasing the span between said tabs beyond the maximum span of said section.

2. The method of claim 1 wherein an insulating layer is affixed to said conductor prior to said securing.

3. The method of claim 1 wherein an insulating layer is affixed to said one tab prior to said securing.

4. The method of claim 1 wherein said conductor is secured before said forming is complete.

5. The method of claim 4 wherein said conductor is secured prior to said forming.

6. The method of claim 1 wherein said aperture is cut into said parent structure.

7. The method of claim 1 wherein said substructure is substantially derived from said parent structure.

The method of claim 1 wherein said forming includes joining an auxiliary member including a said tab into retention by and upon said parent structure.

9. The method of claim 8 wherein said conductor is secured to the included tab before said joining.

* * * * *